United States Patent [19]

Katsuta

[11] Patent Number: 5,721,872
[45] Date of Patent: Feb. 24, 1998

[54] INFORMATION PROCESSING APPARATUS WITH WRITE PROTECTION FUNCTION OF SPECIFIC STORAGE AREA

[75] Inventor: Hiroshi Katsuta, Tokyo, Japan

[73] Assignee: NEC Corporation, Japan

[21] Appl. No.: 519,769

[22] Filed: Aug. 28, 1995

[30] Foreign Application Priority Data

Sep. 9, 1994 [JP] Japan .................... 6-215925

[51] Int. Cl.$^6$ ............................... G06F 12/14
[52] U.S. Cl. ............................. 395/490; 395/481
[58] Field of Search ......................... 395/481, 491, 395/186, 188.01, 490; 326/8

[56] References Cited

U.S. PATENT DOCUMENTS

| 4,332,009 | 5/1982 | Gerson | 395/491 |
| 4,388,695 | 6/1983 | Heinemann | 395/490 |
| 4,665,506 | 5/1987 | Cline | 365/189.01 |
| 5,119,336 | 6/1992 | Hoh | 368/195 |
| 5,457,789 | 10/1995 | Dietrich | 395/427 |

FOREIGN PATENT DOCUMENTS

| 0602867 | 6/1994 | European Pat. Off. | G06F 12/14 |
| 0608060 | 7/1994 | European Pat. Off. | G06F 12/14 |
| 62-248047 | 10/1987 | Japan . | |
| 3-230227 | 10/1991 | Japan . | |
| 4-241642 | 8/1992 | Japan . | |

*Primary Examiner*—Tod R. Swann
*Assistant Examiner*—Christopher S. Chow
*Attorney, Agent, or Firm*—Hayes, Soloway, Hennessey, Grossman & Hage, P.C.

[57] ABSTRACT

An information processing apparatus with a write protection function for a target storage area is provided, which includes a holding section for a write enable flag for indicating whether writing is to be permitted to the target storage area, and a write control section for permitting an intended write operation to the target storage area when the write enable flag held by the holding section indicates the same is to be permitted. The apparatus further includes a setting section for setting the write enable flag in the holding section when a dummy write instruction is executed for a command address, and a resetting section for resetting the write enable flag in the holding section when the intended write operation to the target storage area is executed. The resetting section may further include a section for resetting the write enable flag in the holding section when a predetermined number of instructions or bus cycles are executed after the dummy write instruction.

12 Claims, 6 Drawing Sheets

INFORMATION PROCESSING APPARATUS WITH WRITE PROTECTION FUNCTION OF SPECIFIC STORAGE AREA

BACKGROUND OF THE INVENTION

1. Field of the Invention

The present invention relates to an information processing system, and more particularly, to an information processing system having a protection function for a write operation in a specific storage area.

2. Description of Related Art

In a microcomputer application system, increased need exists for maintaining safety of system. In order to achieve this purpose, various types of apparatus have been devised and employed to monitor for program runaway due to external causes upon execution of the program by a microcomputer. When program runaway occurs, the sequence of program execution becomes abnormal so that desired operation cannot be performed.

One well known runaway detecting system is disclosed in Japanese Laid Open Patent Disclosure (JP-A-Heisei4-241642), which system is based on a clear sequence using a watch dog timer. In this system, the timer is provided to count a predetermined time and is cleared in response to execution of a timer clear instruction. The timer generates a program interrupt when the timer clear instruction is not executed and the timer overflows. In this system, a plurality of timer clear instructions are dispersed in the program to be executed to clear the timer before the timer overflows. When the program is executed in a normal state, clear instructions are necessarily executed before the timer overflows. On the other hand, when the program accidentally runs away from the normal state and enters, for example, an infinite loop, the timer clear instructions are not executed. As a result, the timer overflows and causes generation of the program interrupt. Therefore, runaway of the program can be detected.

Further, a more severe problem can occur wherein a register or memory inside of the microcomputer is unintendedly overwritten, so that the system is affected very adversely. Even in the above-mentioned clear sequence detecting system using the watch dog timer, occasionally there occurs the situation wherein the timer is clear even though the timer clear instruction is not executed. This can occur if a programmer writes an erroneous program or the system erroneously operates as a result of an external factor such as noise or a hardware unit fault occurring during execution of an instruction for another operation. As a result of this phenomena it is necessary to be able to detect when execution of the instruction results in the abnormal operation state and the execution of the instruction needs to be prevented. For this purpose, it is well known to use an error detecting apparatus disclosed in Japanese Laid Open Patent Disclosure (JP-A-Heisei3-230227) in which means for detecting program runaway is provided in an instruction executing unit. In a microprogram control type of microprocessor, each instruction is executed as a result of execution of a plurality of microinstructions and the error detecting apparatus compares a microinstruction currently being executed in association with the instruction, with another microinstruction to be next executed to determine whether a predefined sequence is kept. If the sequence is not kept, an interrupt is generated to prevent the program from running away.

Alternatively, there is also a method of preventing an unintended write operation by allowing the write operation only under a predetermined condition. A processor for achieving the method is disclosed in Japanese Laid Open Patent Disclosure (JP-A-Showa62-248047) in which the write operation into a memory is inhibited using a part of a field making up an instruction code. FIG. 1 illustrates a circuit structure for controlling the write operation inhibition in the above conventional processor. The operation of the circuit will be described below. The circuit includes an instruction register 101 for temporally storing an instruction read out from a ROM (not shown), an AND gate 102 for identifying a type of instruction, a NAND gate 103 as write inhibiting means for inhibiting write operation to a RAM (not shown) built therein, an index register 104 for storing a write address offset, and a 2-input, 5-bit adding circuit 105 for generating a write address. The AND gate 102 inputs signals A30 and A31 outputted from the instruction register 101 and outputs their logical product to the NAND gate 103. The NAND gate 103 directly inputs signals A0 to A29 outputted from the instruction register 101 as well as the output of the AND gate 102. The NAND gate 103 produces a logical product of inputted signals and outputs the inversion of the logical product as a write operation inhibiting signal S. The index register 104 temporally stores data for index. The adding circuit 105 adds output signals A0 to A4 from the instruction register 101 and the output signals of the index register 104 and outputs write address signals AD1 to AD5.

FIG. 2 is a diagram showing the structure of a single instruction which can be read from and written into the RAM (not shown) built in the conventional processor. In FIG. 2, field "TYP" is for specifying type of the instruction, "Radd" and "Wadd" are increments used to generate a read address and write address for the built-in RAM, respectively. Each address is generated through calculation using the offset stored in the index register 104 and the increment.

The write operation to the built-in RAM is performed as follows. That is, the write address AD1 to AD5 for the built-in RAM is generated by adding the increment for the memory write "Wadd" (A0 to A4) and the offset of the index register 104. Here, when the field "TYP" has logical values of "1,1" and the output signals A0 to A4 from the instruction register 101 all have logical values of "1", the write inhibition signal S is set to a logic value of "0" by the NAND gate 103, so that write operation to the built-in RAM is inhibited. On the other hand, when any one of the signals A0 to A4 is not the logical value of "1", the write signal S is set to the logical value of "1", the write operation to the built-in RAM is allowed. In this manner, by producing a predetermined condition using a part of instruction field, it becomes possible to specify the condition such that the built-in RAM is not overwritten in the execution of an instruction.

In the above conventional processor, a part of instruction field is reserved for specification of the permission/inhibition of a write operation. This necessarily requires that the instruction code have a long code length. Specifically, since the instruction for reading from and writing into a memory or register appears very frequently in a program, the influence on the program is so very severe that the code size of the whole program is enlarged. Further, in the case in which a special dedicated instruction needs to be prepared, circuits such as an instruction decoder and a timing control circuit become complicated, so that increase in operation clock frequency is prevented.

The above problems appear as disadvantageous drawbacks in a microcomputer having a RISC type of CPU in which an instruction is basically executed in one clock cycle. For instance, a program for the RISC type of CPU is programmed in a high level language such as C language in many cases and compiled using a compiler for the high level language. In this case, the number of steps of object code to be finally executed is increased by a factor of two compared to object code of a program in assembly language as generally used in a CISC type of CPU. Therefore, when the CPU is built in an apparatus and used for controlling the apparatus, since the capacity of memory built in a device is limited, it is disadvantageous that the code length of instruction code is increased.

Further, in the RISC type of CPU, an instruction set is provided as a group of instructions each of which executes a simple processing operation. The number of instructions is small, typically ½ to ⅓ of the number of instructions in the CISC type of CPU. Therefore, it offers no benefit to the hardware configuration that the RISC type of CPU employs a microprogram system for achieving conventional error detection, because the number of clock cycles required to execute an instruction is increased and it is difficult to increase operation clock frequency.

SUMMARY OF THE INVENTION

The present invention is made to solve the above problems and has, as an object, to provide a method and information processing apparatus for preventing erroneous write operation to a storage area.

Another object of the present invention is to provide a method and information processing apparatus in which a desired write operation can be executed when a permission data indicative of permission of the desired write operation is set in a flag through the execution of a dummy write instruction.

Still another object of the present invention is a method and information processing apparatus in which the permission data can be reset at an arbitrarily set timing.

In order to achieve an aspect of the present invention, an information processing system with a write protection function to a target storage area is provided, which includes a holding section for holding a write enable flag for indicating whether at least one write operation is permitted to be executed for a specific storage area, and a write control section for permitting a desired write operation to a target storage area when the flag indicates that same is permitted.

The information processing system further includes a setting section for setting the flag in the holding section when a dummy write instruction accompanying the write operation to the specific storage area is executed, and a resetting section for resetting the flag in the holding section when the desired write operation to the target storage area is executed. Therefore, the holding section continues to hold the flag until the desired write operation to the target storage area is executed and the holding section releases the flag when the write operation to the target storage area is executed. The setting section includes a first address decoding section for decoding each of addresses on an address bus and the resetting section includes a second address decoding section for decoding each of addresses on the address bus. When the address decoded by the first address decoding section is a first predetermined address such as a command address to which any storage area is not assigned, a dummy write operation is executed to set the flag.

The resetting section may further include a section for resetting the flag in the holding section when a predetermined number of instructions are executed after the dummy write instruction and before the desired write instruction. In this case, it is preferable that the predetermined number of instruction is equal to one, i.e., that the desired write instruction is executed immediately after the dummy write instruction. If any interrupt is generated between the dummy write instruction and the desired write instruction, the desired write instruction is not successfully executed. Therefore, the predetermined number may be more than two.

The write control section preferably includes a delay section for delaying supply of data from the flag to synchronize the data with the write signal from the instruction decoding section.

In order to achieve another aspect of the present invention, in an information processing system, a method of protecting a target storage area from an erroneous write operation is provided, comprising the steps of:

setting a write enable flag in response to execution of at least one dummy write operation to a specific storage area; and permitting a desired write operation to the target storage area only when the flag is set.

The desired write instruction and the dummy write instruction may be automatically generated from a statement corresponding to the desired write instruction in a user program by a compiler.

DESCRIPTION OF THE PREFERRED EMBODIMENTS

An information processing apparatus such as a microcomputer system according to the present invention will be described below with reference to the drawings. In one embodiment, a register or memory storing data for designating the basic operation condition of the information processing apparatus is protected from an unintended write operation.

Figure 1:
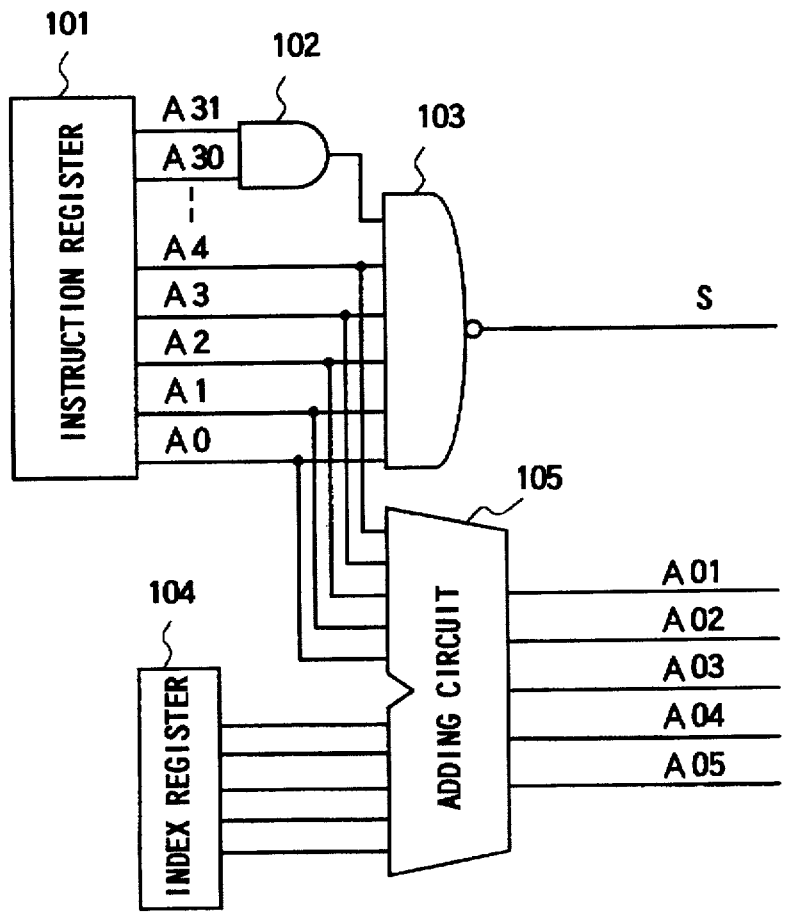
FIG. 1 is a block diagram of a write protection circuit of a conventional information processing apparatus.
Figure 2:
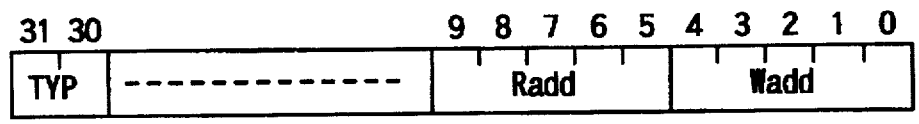
FIG. 2 is a diagram showing the format of an instruction used in the conventional information processing apparatus shown in FIG. 1.
Figure 3:
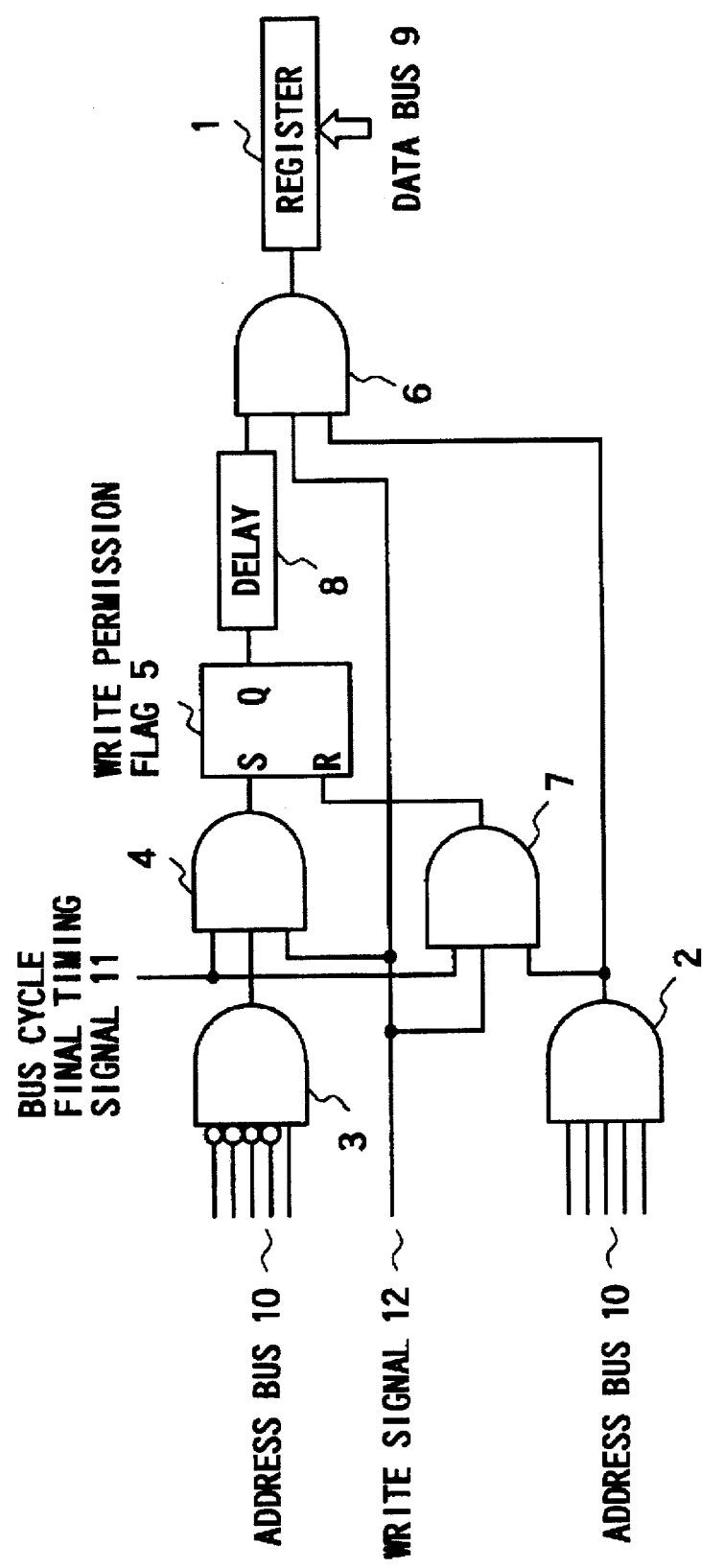
FIG. 3 is a block diagram of a write protection circuit of an information processing apparatus according to a first embodiment of the present invention.

FIG. 3 is a block diagram of a write protection circuit of the information processing apparatus according to the first embodiment. In this embodiment, in order to permit a write operation into a register whose contents must not be unintentionally overwritten by, for example, program ranaway, a dummy write operation is first executed to a specific address to be referred to as a command address, data indicative of the execution of the dummy write operation is stored, and then an intended write operation is executed to the register to be overwritten, based on the stored data. In this case, even the intended write operation is not permitted when the data indicative of the execution of the dummy write operation is not stored.

Referring to FIG. 3, the structure of the write protection circuit of an information processing apparatus according to the first embodiment will be described. In FIG. 3, a register 1 is a target register to be protected. Data for a desired operation of the information processing apparatus is supplied from a CPU (not shown) through the data bus 9 and set therein when a write enable signal is supplied thereto. For instance, the data to be set in the target register 1 may be the selection of operation clock frequency, selection of operation modes of terminals, or selection of low power consumption mode. The results of these selections determine the basic operation of the microcomputer system and, therefore, it is usually desired that the data stored in the target register 1 must not be overwritten during the operation of the microcomputer system after the data is set upon the initiation of system, because there is the possibility that the overwrite may affect the system very adversely.

An AND gate 3 is connected to an address bus 10 and functions to decode addresses on the address bus 10 in order to detect a command address. That is, the AND gate 3 outputs a logic value of "1" when a predetermined address appears on the address bus 10 such as the command address. Here, the command address is an address to which a dummy write operation must be executed in advance when an intended write operation is to be executed to a register such as the target register 1 to be protected from an erroneous write operation. The command address is assigned with no register or memory to which the write operation is executed. The output of the AND gate 3 is supplied to an AND gate 4. The AND gate 4 inputs a bus cycle final timing signal 11 and a write signal 12 in addition to the output of the AND gate 3. The CPU executes each instruction in accordance with one or more bus cycles and the signal 11 is the final one of timing signals of each bus cycle. When an instruction decoder (not shown) decodes each of the instructions, if the decoded instruction is a write instruction to any storage area, the instruction decoder issues write signal 12. The AND gate 4 outputs the logic value of "1" only when both the signals 11 and 12 have the logic values of "1" and the output of the AND gate 3 is the logic value of "1". The output of the AND gate 4 is connected to a write enable flag 5 composed of an RS flip-flop at the S (set) terminal. That is, the AND gate 4 functions as means for setting the enable data in the flag 5.

An AND gate 2 is also connected to the address bus 10 and functions to decode addresses on the address bus 10 in order to detect an address assigned to the target register 1. That is, the AND gate 2 outputs the logic value of "1" when the address of the target register 1 appears on the address bus 10. The output of the AND gate 2 is supplied to an AND gate 7 and an AND gate 6. The AND gate 7 inputs the bus cycle final timing signal 11 and the write signal 12 in addition to the output of the AND gate 2. The AND gate 7 outputs the logic value of "1" only when both the signals 11 and 12 have the logic values of "1" and the output of the AND gate 2 is logic value of "1". The output of the AND gate 7 is connected to the RS flip-flop containing flag 5 at the R (reset) terminal. That is, the AND gate 7 functions as means for setting and resetting the enable data in the flag 5.

The flip-flop comprising flag 5 outputs from the Q terminal the logic value of "1" at the set state and the logic value of "0" at the reset state. The Q output of the flag 5 is connected to a delay circuit 8. The delay circuit 8 is for delaying the Q output of the flag 5 such that the Q output overlaps with an interval during which the write signal 12 for the intended write operation is active (logic value of "1"). An AND gate 6 inputs the output from the delay circuit 8, the write signal 12, and the output of the AND gate 2. The AND gate 6 outputs the logic value of "1" as the write enable signal only when the output of the AND gate 2 is the logic value of "1", when the output of the delay circuit 8 is active (logic value of "1"), and when the write signal 12 is the logic value of "1". The output of the AND gate 6 is connected to the target register 1 and when this signal is the logic value of "1" as the write enable signal, the data on the data bus 9 is written into the target register 1. That is, the write operation to the target register 1 is permitted on the condition that the write signal 12 to the target register 1 is active (logic value of "1"), if an intended write operation is to be executed for the target register 1 when the flag 5 is set to the logic value of "1". Here, delay circuit 8 prevents generation of noise at the AND gate 6 by change of the flag 5 to the logic value of "1" while the dummy write operation to the command address is executed. Also, the delay circuit 8 prevents the intended write operation from being suspended, because the flag 5 changes into the logic value of "0" during the intended write operation to the target register 1 so that the write permission condition is not satisfied at the AND gate 6.

Next, the operation of the write protection circuit according to the first embodiment will be described below with reference to FIGS. 4A to 4H showing timing charts of various signals in the write protection circuit.

Figure 4:
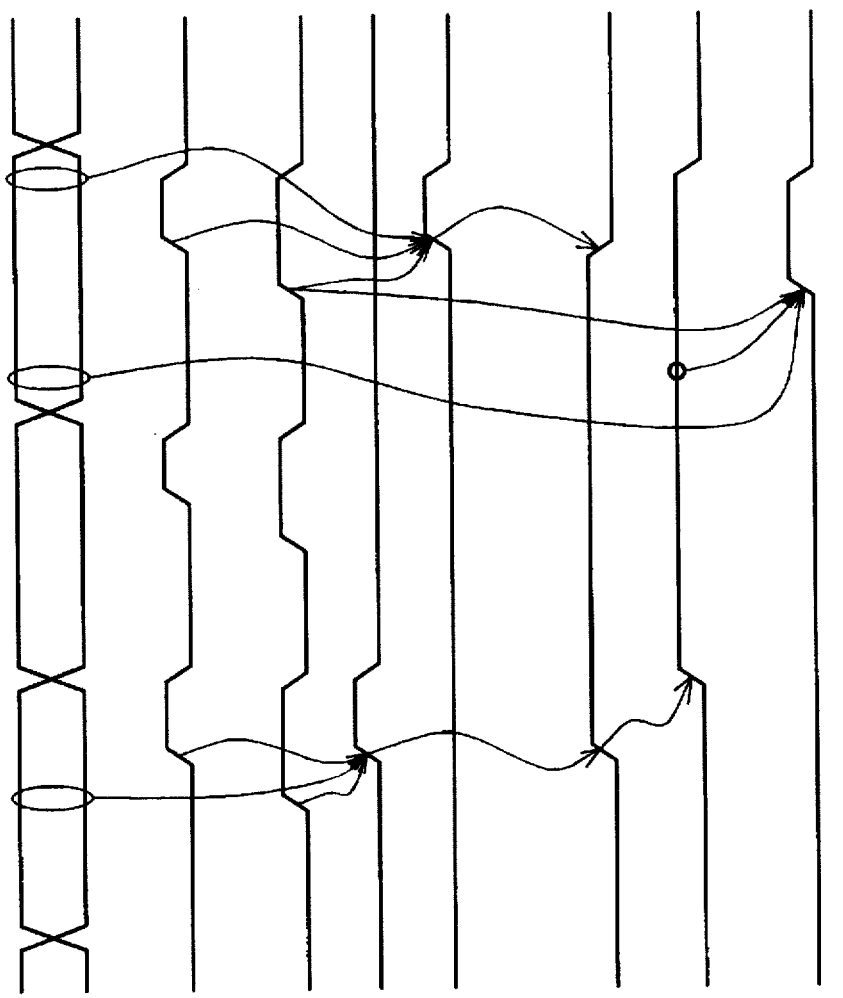
FIGS. 4A to 4H are timing charts of the write protection circuit according to the first embodiment of the present invention.

In this embodiment, a dummy write instruction necessarily precedes an intended write instruction to the target register 1. The CPU (not shown) first executes the dummy write instruction with the predetermined command address. An instruction decoder (not shown) in the CPU decodes the dummy write instruction and issues a write signal 12 as shown in FIG. 4C. At the same time, the command address and dummy data are outputted on the address bus 10, as shown in FIGS. 4A, and on the data bus 9, respectively. In this situation, the output of the AND gate 3 changes to the logic value of "1" because of the command address and as a result of this the output of the AND gate 4 also changes into the logic value of "1" as shown in FIG. 4D. Therefore, data is set in the flag 5 to enable writing, as shown in FIG. 4F. The output from the flag 5 is delayed as shown in FIG. 4G and supplied to the AND gate 6, comprising a write control section.

Next, an intended write operation to the target register 1 is executed in the same manner as the dummy write operation. The output of the AND gate 2 then becomes the logic value of "1" but the output of the AND gate 3 is kept at the logic value of "0". Accordingly, the output of the AND gate 7 becomes active as shown in FIG. 4E, so that the flag 5 is reset as shown in FIG. 4F. In this case, the output from the flag 5 as delayed by the delay circuit 8 and the write signal 12 are supplied to the AND gate 6 as well as the output of the AND gate 2, as shown in FIGS. 4C and 4G. As a result, a write enable signal is outputted to the target register 1 as shown in FIG. 4H so that data supplied on the data bus 9 when the intended write instruction is executed can be written in the target register 1.

As seen from the above, when the dummy write operation has been not executed for the command address in advance, the flag 5 holds data for prohibiting writing, i.e., the logic value of "0". Accordingly, even if the intended write operation to the target register 1 is executed, the intended write operation is actually prohibited. In contrast, if the dummy write operation has been executed in advance, the intended write operation can be performed even though any instruction is executed before the intended write instruction.

The write protection circuit according to the present embodiment can be readily implemented by providing a plurality of sets of circuits corresponding to the AND gate 2 and AND gate 6, even if there are two or more registers to be protected, although the above description is directed to the situation wherein there is a single register to be protected.

Figure 5:
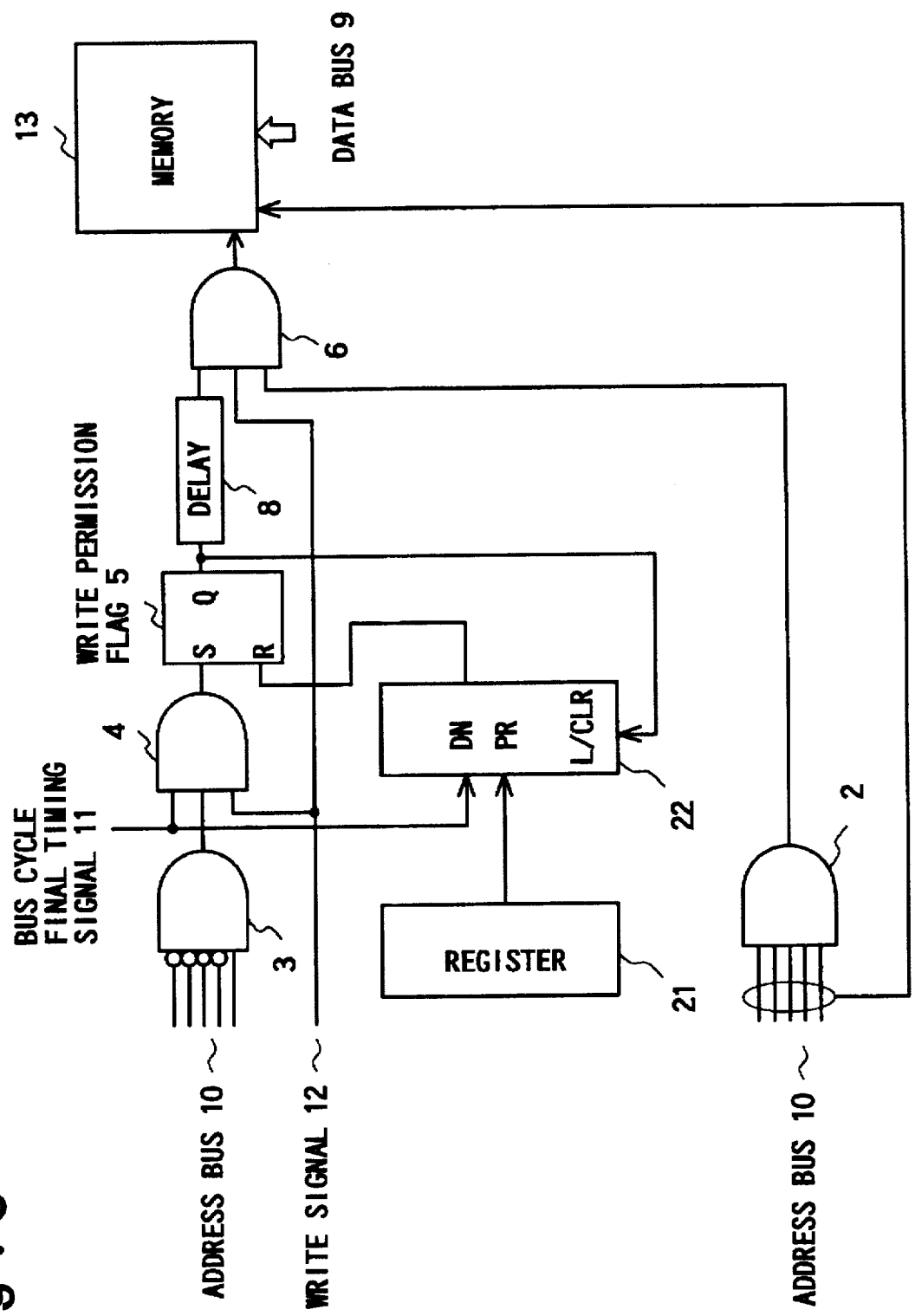
FIG. 5 is a block diagram of a write protection circuit of an information processing apparatus according to a second embodiment of the present invention.

Next, the write protection circuit in the information processing apparatus according to the second embodiment of the present invention will be described below with reference to FIG. 5. FIG. 5 shows a block diagram of the write protection circuit according to the second embodiment. In the first embodiment, once the flag 5 is set through the dummy write operation, the flag 5 is not reset until the intended write operation is executed. On the other hand, in the second embodiment, the flag is reset when the predetermined number of bus cycles have passed after the flag is set. Also, a memory area is protected from an erroneous write instruction in place of the register.

Referring to FIG. 5, the structure of the write protection circuit according to the second embodiment will be described. In FIG. 5, memory 13 is the target memory to be protected. Data for desired operation of the information processing apparatus is supplied from the CPU (not shown) through the data bus 9 and set therein when the write enable signal is supplied thereto. For instance, the data to be set in the target memory 13 may be control information for a memory system, control information for a file system, and processor operation conditions in an operating system (OS). This information determines the basic operation of the microcomputer system and, therefore, the data stored in the target memory 13 must be not changed by an application program other than the OS, because there is the possibility that the change may affect the system very adversely.

The AND gate 3 received an address from an address bus 10 and decodes the received address so as to output the logic value of "1" when the command address appears on the address bus 10. The output of the AND gate 3 is supplied to an AND gate 4. The AND gate 4 inputs the bus cycle final timing signal 11 and the write signal 12 in addition to the output of the AND gate 3, as in the first embodiment. The AND gate 4 outputs the logic value of "1" only when both the signals 11 and 12 have the logic values of "1" and the output of the AND gate 3 is the logic value "1". The output of the AND gate 4 is set in the RS flip-flop as the write enable flag 5. That is, the AND gate 4 functions as means for setting the data in the flag 5.

In the second embodiment, the AND gate 7 is omitted, and a register 21 and a down counter 22 are provided instead. The register 21 is a register similar to the register 1 in the first embodiment and holds a value. The down counter 22 is connected to the Q output of the flag 5 and becomes active to latch the value stored in the register 21 when the write enable flag 5 is set. The down counter 22 does not output the logic value of "1" when the output of the flag 5 is inactive. The down input of the counter 22 is supplied with the bus cycle final timing signal 11. Accordingly, the value latched in the counter 22 is counted down in response to the final timing signal 11 of each of the bus cycles. When the count of the counter 22 reaches zero, a reset signal of logic value of "1" is issued to the R terminal of the write enable flag 5 to reset it. In this manner, in this embodiment, the address of the intended write operation is not used to reset the flag 5. When a predetermined number of bus cycles have passed, the write enable flag 5 is reset. The value stored in the register 21 is usually "2". This means that the intended write instruction should be executed immediately after the dummy write instruction. However, the value may be more than two. Further, in the embodiment, the bus cycle final timing signal 11 is supplied to the down counter 22. However, a clock signal indicative of the decoding of instructions may be supplied. That is, the clock signal which becomes active each time an instruction decoder (not shown) decodes the instruction may be supplied. In this situation, the value stored in the register 21 corresponds to the number of instructions.

The AND gate 2 decodes each address on the address bus 10 and outputs the logic value of "1" when the decoded address is for the target memory 13. The address is also supplied to the target memory 13. The flip-flop comprising flag 5 outputs from the Q terminal the logic value of "1" at the set state and the logic value of "0" at the reset state. The Q output of the flag 5 is connected to the AND gate 6 through the delay circuit 8. The AND gate 6 inputs the output from the delay circuit 8, the write signal 12, and the output of the AND gate 2. The AND gate 6 outputs the logic value of "1" as the write enable signal only when the output of the AND gate 2 is the logic value of "1", when the output of the delay circuit 8 is active (logic value of "1"), and when the write signal 12 is the logic value of "1". The output of the AND gate 6 is connected to the target memory 13 and when this signal is the logic value of "1" as the write enable signal, the data on the data bus 9 is written into the target memory 13. That is, the write operation to the target memory 13 is permitted on the condition that the write signal 12 to the target memory 13 is active (logic value of "1"), if an intended write operation is to be executed for the target memory 13 when the write enable flag 5 is set to the logic value of "1".

The operation of the write protection circuit accordingly to the second embodiment is similar to the first embodiment and would be apparent to the person skilled in the art. Therefore, this description will be omitted.

As seen the above description, in the second embodiment, the intended write instructions can be executed only within the number of bus cycles or instructions corresponding to the value set in the register 21 after the flag 5 is set.

Next, the write protection circuit according to the third embodiment of the present invention will be described below with reference to FIG. 6. In the third embodiment, features of the first embodiment and of the second embodiment are incorporated.

Figure 6:
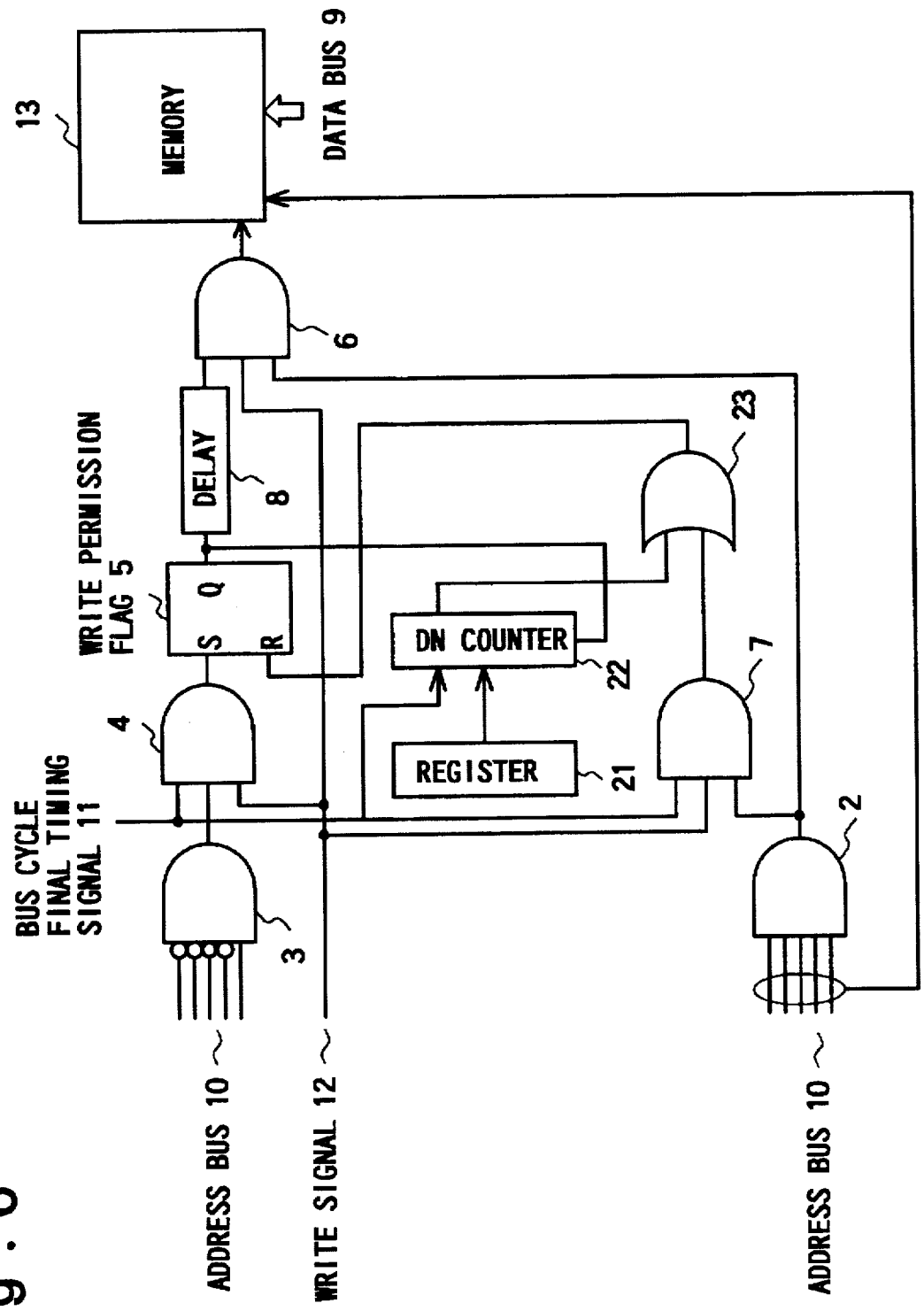
FIG. 6 is a block diagram of a write protection circuit of an information processing apparatus according to a third embodiment of the present invention.

Referring to FIG. 6, the structure of the write protection circuit according to the second embodiment will be described. In FIG. 6, memory 13 is the target memory to be protected. The AND gate 3 receives an address from an address bus 10 and decodes the received address to output the logic value of "1" when the command address appears on the address bus 10. The output of the AND gate 3 is supplied to the AND gate 4. The AND gate 4 inputs the bus cycle final timing signal 11 and the write signal 12 in addition to the output of the AND gate 3, as in the first embodiment. The AND gate 4 outputs the logic value of "1" only when both the signals 11 and 12 have the logic values of "1" and the output of the AND gate 3 is the logic value of "1". The output of the AND gate 4 sets the RS flip-flop as the write enable flag 5. That is, the AND gate 4 functions as means for setting the data in the flag 5.

The AND gate 2 also receives addresses from the address bus 10 and decodes the addresses so as to output the logic value of "1" when the address of the target memory 13 appears on the address bus 10. The output of the AND gate 2 is supplied to the AND gates 6 and 7. The AND gate 7 inputs the bus cycle final timing signal 11 and the write signal 12 in addition to the output of the AND gate 2. The AND gate 7 outputs a logic value of "1" only when both the signals 11 and 12 have the logic values of "1" and the output of the AND gate 2 is the logic value of "1", as in the first embodiment. The output of the AND gate 7 is supplied to an OR gate 23.

Further, the register 21 and the down counter 22 are provided, as in the second embodiment. The register 21 holds a value. The down counter 22 is connected to the output of the flag 5 and becomes active to latch the value stored in the register 21 when the write enable flag 5 is set. The down counter 22 does not output the logic value of "1" when the output of the flag 5 is inactive. The down input of the counter 22 is supplied with the bus cycle final timing signal 11. Accordingly, the value latched in the counter 22 is counted down in response to the final timing signal 11 of each of the bus cycles. When the count of the counter 22 reaches zero, a reset signal of the logic value of "1" is issued to the OR circuit 23. The output of the OR gate 23 is supplied to the R terminal of the flag 5 to reset it. In this manner, in the third embodiment, the flag 5 is reset when the intended write is executed and when the number of bus cycles or instructions corresponding to the value stored in the register 21 is passed even if the intended write instruction is not executed.

The address on the address bus 10 is also supplied to the target memory 13. The flip-flop comprising the flag 5 outputs from the Q terminal the logic value of "1" at the set state and the logic value of "0" at the reset state. The Q output of the flag 5 is connected to the AND gate 6 through the delay circuit 8. The AND gate 6 inputs the output from the delay circuit 8, the write signal 12, and the output of the AND gate 2. The AND gate 6 outputs the logic value of "1" as the write enable signal only when the output of the AND gate 2 is the logic value of "1", when the output of the delay circuit 8 is active (logic value of "1"), and when the write signal 12 is the logic value of "1". The output of the AND gate 6 is connected to the target memory 13 and when this signal is the logic value of "1" as the write enable signal, the data on the data bus 9 is written into the target memory 13. That is, the write operation to the target memory 13 is permitted when the write signal 12 to the target memory 13 is active (logic value of "1"), if an intended write operation is to be executed for the target memory 13 when the write permission flag 5 is set to the logic value of "1".

The operation of the write protection circuit according to the third embodiment is similar to the first and second embodiments and would be apparent to the person skilled in the art. Therefore, this description will be omitted.

As seen the above description, the third embodiment includes features of the first and second embodiments.

Figure 7A:
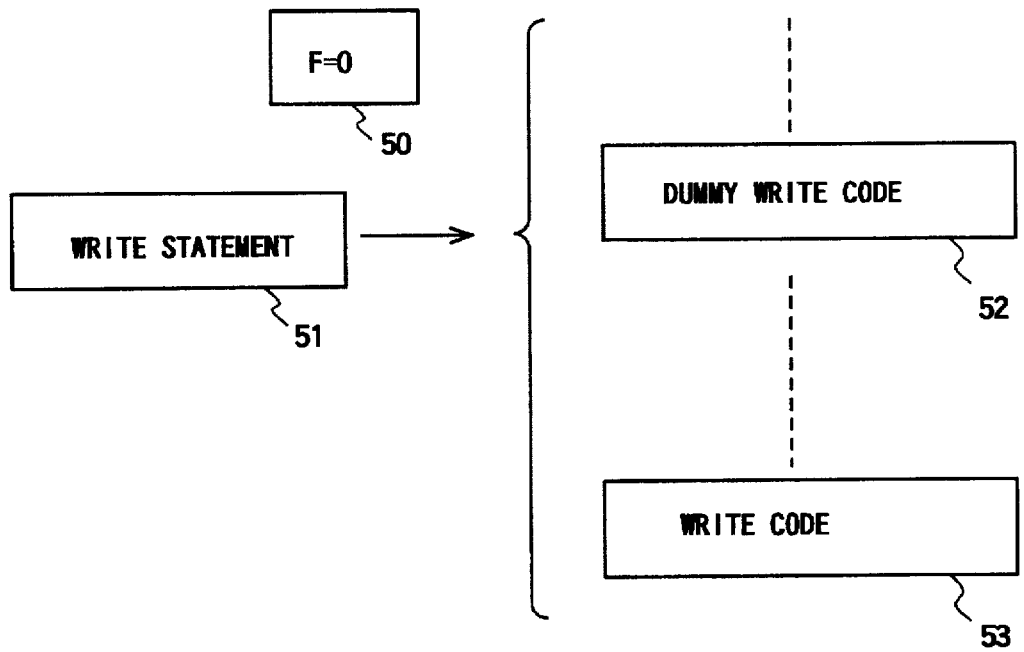
FIGS. 7A and 7B are diagrams showing compiling operation to produce object program codes used in the present invention.
Figure 7B:
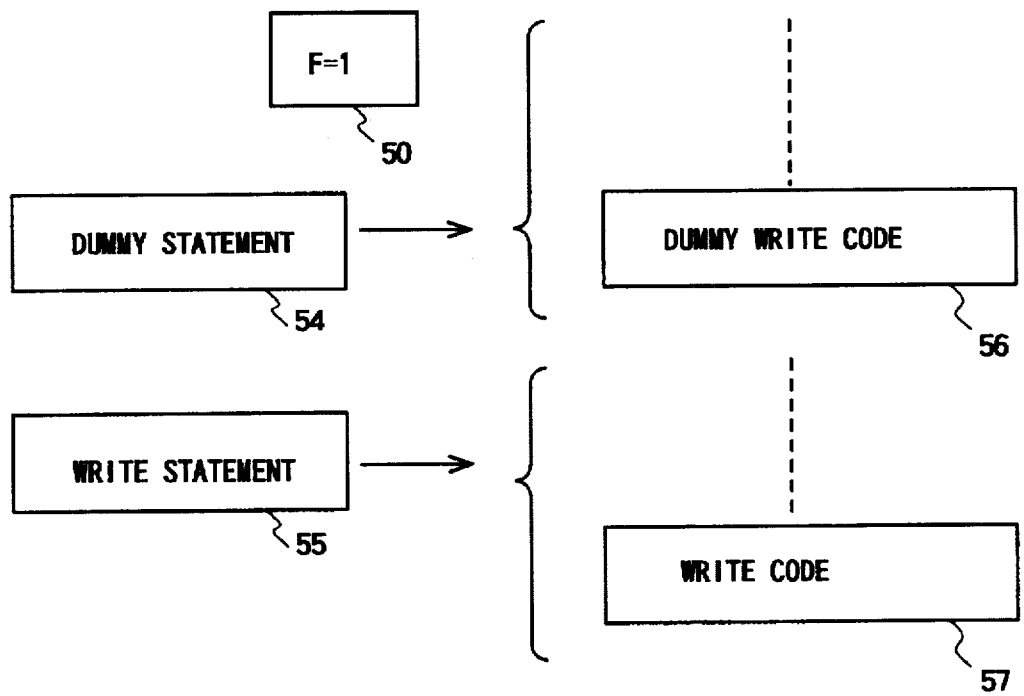

Next, a method of compiling an application program in a high level language into an object code adapted for the write protection circuit will be described with reference to FIGS. 7A and 7B. A compiler used in this method includes a flag 50. When the flag 50 is set as shown in FIG. 7B, a dummy write statement 54 and an intended write statement 55 are carefully and intentionally described by a programmer and compiled into the dummy write instruction code 56 and the intended write instruction code 57, respectively. As a result, any erroneous write operation to a specific storage area for the target register or memory can be prevented. When there is no problem in the programming, the flag 50 is reset as shown in FIG. 7A. As a result, a single intended write statement is compiled into the dummy write instruction code 52 and intended write instruction code 53. For this reason, the work load of the programmer can be lightened while the target register or memory can be protected from erroneous write operation.

As described above, the write protection circuit according to the present invention has a predetermined address in a memory space as a command address and a dummy write operation is executed prior to the actual intended write operation when the write operation is to be executed for a register or memory to be protected. An empty address to which a register or memory in the system is not assigned is assigned as the command address. Accordingly, the write protection circuit can be achieved without requiring dedicated instruction for write enabling/disabling, without specifying part of an instruction code, and without making the architecture of the processor complicated. Also, it is not necessary to introduce a more complicated sequence in the microprogram system.

Further, it is not necessary to provide any hardware such as a register for the command address and therefore the present invention can be readily achieved with simple decoders and flip-flops. Furthermore, the present invention is superior in general usability such that write protection function can be readily achieved even for a plurality of registers by selecting the decode conditions of address decoders.

What is claimed is:

1. An information processing apparatus for protecting a target storage area from an erroneous write operation in execution of an application program composed of a sequence of instructions, comprising:

instruction decoding means for decoding the instructions one by one and for issuing a write signal when the decoded instruction is a write instruction to any storage area;

first address decoding means for decoding each of addresses on an address bus;

second address decoding means for decoding each of addresses on said address bus;

a write enable flag for holding data indicative of whether writing to said target storage area is to be permitted or prohibited;

setting means for setting said flag to indicate that said writing is to be permitted, at a first predetermined timing of a bus cycle associated with decoded address by said first address decoding means when a first write instruction of the decoded instructions by said instruction decoding means is a write instruction to a specific storage area;

resetting means for resetting said flag to indicate that said writing is to be prohibited, at a second predetermined timing of a bus cycle associated with decoded address by said second address decoding means when a second write instruction of the decoded instructions by said instruction decoding means is a write instruction to said target storage area; and write operation permitting means for preventing said writing to said target storage area when said flag holds data indicative that said writing is to be prohibited, and for permitting said writing to said target storage area when said flag holds data indicative that said writing is to be permitted;

wherein said apparatus is adapted to automatically prevent said writing to said target storage area in response to completion of write operation resulting from said second write instruction; and wherein said resetting means further includes means for resetting said flag to indicate that said writing is to be prohibited when said second write instruction is not executed for a predetermined number of instructions from when said flag is set to indicate that said writing is to be permitted.

2. The information processing apparatus according to claim 1, wherein the predetermined number of instructions is one.

3. The information processing apparatus according to claim 1, wherein said first address decoding means decodes each of the addresses on said address bus to determine that the decoded address designates said specific storage area.

4. The information processing apparatus according to claim 3, wherein the specific storage area is designated by an empty address to which no unit is assigned.

5. The information processing apparatus according to claim 1, wherein said write operation permitting means includes delay means for delaying supply of the data from said flag to synchronize said data with the write signal from said instruction decoding means.

6. A method of protecting a target storage area from an erroneous write operation in an information processing apparatus comprising the steps of:

holding data, indicative that a desired write operation is to be permitted to said target storage area, in response to execution of at least one dummy write operation to a specific storage area;

permitting said desired write operation to said target storage area only when said data is held; and automatically resetting, in response to completion of the desired write operation, said data to indicate that writing to said target storage area is to be prohibited and;

resetting said data to indicate that said writing is to be prohibited, when a predetermined number of instructions are executed without occurrence of said desired write operation after said data are held.

7. The method according to claim 6, wherein said desired write instruction follows said dummy write instruction without interposition of any instruction.

8. The method according to claim 6, wherein said desired write instruction and said dummy write instruction are automatically generated from a statement corresponding to said desired write instruction in a user program by a compiler.

9. An information processing apparatus with a write protection function to a target storage area, comprising:

holding means for holding data having a first state for indicating that writing is to be permitted to said target storage area and at least one write operation has been executed for a specific storage area;

write control means for permitting a desired write operation to said target storage area when said holding means holds said data having said first state;

first resetting means for resetting said data to another state for indicating that said writing is to prohibited, in response to completion of the desired write operation; and second resetting means for resetting said data to said other state when the desired write operation is not executed for a predetermined number of instructions after the write operation has been executed for the specific storage area.

10. The information processing apparatus according to claim 9, wherein the predetermined number of instruction is one.

11. The information processing apparatus according to claim 9, further comprising:

setting means for setting said data to said first state in said holding means when a dummy write instruction accompanying the write operation to said specific storage area is executed.

12. The information processing apparatus according to claim 9, wherein said desired write instruction and said dummy write instruction are automatically generated from a statement corresponding to said desired write instruction in a user program by a compiler.

* * * * *

UNITED STATES PATENT AND TRADEMARK OFFICE
CERTIFICATE OF CORRECTION

PATENT NO. : 5,721,872
DATED : February 24, 1998
INVENTOR(S) : Hiroshi Katsuta

It is certified that error appears in the above-identified patent and that said Letters Patent is hereby corrected as shown below:

Claim 9, Col. 12, line 17, insert --be-- before "prohibited".

Signed and Sealed this

Twentieth Day of October, 1998

Attest:

BRUCE LEHMAN

*Attesting Officer*  *Commissioner of Patents and Trademarks*